(12) United States Patent
Xie et al.

(10) Patent No.: US 12,470,711 B2
(45) Date of Patent: Nov. 11, 2025

(54) CONTENT-ADAPTIVE SIGNAL-TO NOISE-RATIO-GUIDED TWO-PASS VIDEO ENCODING FOR CLOUD GAMING

(71) Applicant: GOOGLE LLC, Mountain View, CA (US)

(72) Inventors: Richard Xie, Cupertino, CA (US); Ramachandra Tahasildar, Cupertino, CA (US); Alex Sukhanov, Sunnyvale, CA (US); Danny Hong, New York, NY (US); Beril Erkin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/033,473

(22) PCT Filed: Nov. 25, 2020

(86) PCT No.: PCT/US2020/062161
§ 371 (c)(1),
(2) Date: Apr. 24, 2023

(87) PCT Pub. No.: WO2022/115102
PCT Pub. Date: Jun. 2, 2022

(65) Prior Publication Data
US 2023/0396766 A1 Dec. 7, 2023

(51) Int. Cl.
*H04N 19/124* (2014.01)
*A63F 13/355* (2014.01)
(Continued)

(52) U.S. Cl.
CPC ......... *H04N 19/124* (2014.11); *A63F 13/355* (2014.09); *H04N 19/132* (2014.11);
(Continued)

(58) Field of Classification Search
CPC .. H04N 19/132; H04N 19/124; H04N 19/146; H04N 19/147; H04N 19/463; A63F 13/355
See application file for complete search history.

(56) References Cited

U.S. PATENT DOCUMENTS 9,210,420 B1 12/2015 Jia
10,360,695 B1 7/2019 Jean et al.
(Continued)

FOREIGN PATENT DOCUMENTS

JP 2007306277 A 11/2007
WO 2016182686 A1 11/2016

OTHER PUBLICATIONS

International Search Report and Written Opinion mailed Aug. 23, 2021 for PCT Application No. PCT/US2020/062161, 15 pages.
(Continued)

*Primary Examiner* — Md N Haque

(57) ABSTRACT

Techniques for encoding game content for real-time cloud-gaming, and more specifically to using an adaptive statistical model in a moving window of previous frames up to a current frame to adaptively compute a lower-bound of a quantization parameter (QP) that corresponds to a chosen peak signal to noise ratio (PSNR) target. The result of this PSNR-guided encoding is significantly reducing the size of encoded frames (i.e., undershooting a target bit rate when there are no subjective quality losses on those frames using their PSNR as the guidance). These reductions mitigate bandwidth issues and improve the overall user experience because less bits transferred results in faster network transmission and decoding, as well as less platform overhead.

20 Claims, 4 Drawing Sheets

(51) Int. Cl.
*H04N 19/132* (2014.01)
*H04N 19/136* (2014.01)
*H04N 19/172* (2014.01)
*H04N 19/42* (2014.01)
*H04N 19/463* (2014.01)

(52) U.S. Cl.
CPC ......... *H04N 19/136* (2014.11); *H04N 19/172* (2014.11); *H04N 19/42* (2014.11); *H04N 19/463* (2014.11)

(56) References Cited

U.S. PATENT DOCUMENTS

| | | | |
|---|---|---|---|
| 2005/0053151 | A1 | 3/2005 | Lin et al. |
| 2015/0281709 | A1 | 10/2015 | Bracha et al. |
| 2015/0334395 | A1* | 11/2015 | Schwartz ............ H04N 19/186 375/240.03 |
| 2018/0146198 | A1* | 5/2018 | Atluru ................. H04N 19/167 |
| 2018/0176535 | A1* | 6/2018 | Ninan ............. H04N 21/44218 |
| 2019/0373040 | A1* | 12/2019 | Grubbs ................. H04L 65/65 |
| 2019/0379893 | A1 | 12/2019 | Krishnan |
| 2020/0013215 | A1* | 1/2020 | Vosoughi ............. G06T 17/005 |
| 2020/0137389 | A1* | 4/2020 | Qiu ..................... H04N 19/192 |

OTHER PUBLICATIONS

Shen, Yu-Yao et al., "Two Pass Rate Control for Consistent Quality Based on Down-Sampling Video in HEVC", 2018 IEEE International Conference on Multimedia and Expo (ICME), IEEE, Jul. 23, 2018 (Jul. 23, 2018), pp. 1-6, XP033417620, DOI: 10.1109/ICME.2018.8486544 [retrieved on Oct. 8, 2018].
Zhang, Dongdong et al., "A two-pass rate control algorithm for H.264/AVC high definition video coding", Signal Processing: Image Communication, V. 24, 2009, pp. 357-367.
Wu, Ping-Hao et al., "Frame-Layer Constant-Quality Rate Control of Regions of Interest for Multiple Encoders With Single Video Source", IEEE Transactions on Circuits and Systems for Video Technology, vol. 17, No. 7, Jul. 2007, pp. 857-867.
Machine Translation of Japanese Notice of Reasons for Refusal mailed Dec. 5, 2024 for JP Application No. 2023-531515, 7 pages.
Translation of Chinese Notification of First Office Action mailed Jan. 8, 2025 for CN Application No. 202080106947.4, 23 pages.
Communication pursuant to Article 94(3) EPC mailed May 15, 2025 for EP Application No. 20828449.7, 8 pages.
Machine Translation of Japanese Notice of Reasons for Refusal mailed May 20, 2025 for JP Application No. 2023-531515, 5 pages.
Machine Translation of Notice of Reasons for Refusal mailed Sep. 3, 2025 for JP Application No. 2023-531515, 2 pages.

\* cited by examiner

CONTENT-ADAPTIVE SIGNAL-TO NOISE-RATIO-GUIDED TWO-PASS VIDEO ENCODING FOR CLOUD GAMING

CROSS-REFERENCE TO RELATED APPLICATIONS

The present application is a U.S. National Stage under 35 U.S.C. § 371 of International Patent Application Serial No. PCT/US2020/062161, entitled "CONTENT-ADAPTIVE SIGNAL-TO NOISE-RATIO-GUIDED TWO-PASS VIDEO ENCODING FOR CLOUD GAMING" and filed on Nov. 25, 2020, the entirety of which is incorporated by reference herein.

BACKGROUND

Various cloud gaming platforms support use of encoding operations to compress the game content in real-time to a video stream that is delivered to a user's device on the Internet. Typically, an encoder employs a quantization parameter (QP) to control how the game content is encoded and in particular how much information is preserved during encoding operation. Some encoders select the QP for each frame (also referred to as media frame, video frame, image, and the like) depending on the size of the frame. As such, these encoders select a QP to meet a target bit rate (i.e., frame size). These encoders, however, result in encoding operations on game content that cause added unnecessary bandwidth usage for the encoders (or devices associated with the encoder), and in some cases increase end-to-end latency, thereby negatively impacting the user experience.

SUMMARY

The present disclosure in particular relates to encoding media content in frames based on a determined peak signal to noise ratio (PSNR). For example, the proposed solution may include using an adaptive statistical model in a moving window of previous frames up to a current frame to adaptively compute a lower-bound of a QP that corresponds to a PSNR target. The result of a corresponding PSNR-guided encoding may significantly reduce the size of encoded frames (i.e., undershooting a target bit rate when there are no subjective quality losses on those frames using their PSNR as the guidance). These reductions mitigate bandwidth issues and improve the overall user experience because less bits transferred results in faster network transmission and decoding, as well as less platform overhead.

In accordance with one aspect, a method for encoding video for real-time cloud-gaming, comprising: determining a PSNR associated with encoding a downscaled version of each frame of a stream of frames in a first encoding pass; and in response to the first encoding pass, encoding each frame of the stream of frames in a second encoding pass based on the PSNR.

The method may also include determining a minimum QP associated with a selected target PSNR for encoding each frame of the stream of frames based on a statistical linear-regression model. In some implementations, encoding a frame of the stream of frames IS based on the minimum QP for the encoded frame to satisfy the selected target PSNR.

The method may also include determining a linear mapping from the PSNR to the minimum QP for each frame by fitting pairs of PSNR and QPs in a moving window of previous frames of a double-ended queue to a linear curve.

In some embodiments, the linear mapping is updated after the second encoding pass of each frame.

The method may also include determining a lower bound value of the minimum QP based on the selected target PSNR and the updated linear mapping for each frame with the stream of frames.

The method may also include determining an intersection and a slope of the linear mapping from the PSNR to the minimum QP based on the moving window of previous frames.

The method may also include maintaining a size of the moving window of previous frames associated with pairs of PSNRs and QPs.

The method may also include updating a statistical model based on the PSNR associated with each frame of the stream of frames, where encoding each frame of the stream of frames is based on the minimum QP from the statistical model.

The method may also include computing the PSNR associated with each frame of the stream of frames by the encoder between an uncompressed frame and a reconstructed frame in the first encoding pass; and computing the PSNR associated with each frame of the stream of frames by the encoder between the uncompressed frame and the reconstructed frame in the second encoding pass.

In some embodiments, the statistical model comprises a linear regression model based on the pairs of PSNRs and QPs.

The method may also include determining a target PSNR threshold, where encoding each frame of the stream of frames is based on the target PSNR threshold.

The method may also include down sampling each frame of the stream of frames based on a down sampling parameter; and in response to the down sampling, encoding the downsampled frame of the stream of frames based on a target bit rate parameter.

In accordance with another aspect, an apparatus for encoding video for real-time cloud-gaming, comprising: one or more processors; memory coupled to the one or more processors; and instructions executable by the one or more processors to: determine a minimum QP based on a selected target PSNR; and encode each frame of the stream of frames based on the minimum QP.

In some embodiments, the instructions are further executable by the one or more processors to update a statistical model based on the peak-signal-to-noise ratio associated with each frame of the stream of frames. In some embodiments, the statistical model comprises a linear regression model. In some other embodiments, the linear regression model is based on one or more pairs of PSNRs and QPs.

In some embodiments, the instructions are further executable by the one or more processors to down sample each frame of the stream of frames based on a down sampling parameter; and in response to the down sampling, encode the downsampled frame of the stream of frames based on a target bit rate parameter.

In accordance with yet another aspect, non-transitory computer-readable medium storing code for encoding game content for real-time cloud-gaming at a device, the code comprising instructions executable by a processor of the device to: determine a minimum QP based on a selected target PSNR; and encode each frame of the stream of frames based on the minimum QP.

In some embodiments, the instructions are further executable by the processor of the device to update a statistical model based on the PSNR associated with each frame of the stream of frames. The statistical model comprises a linear regression model.

The linear regression model is based on one or more pairs of peak-signal-to-noise ratio and quantization parameters.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
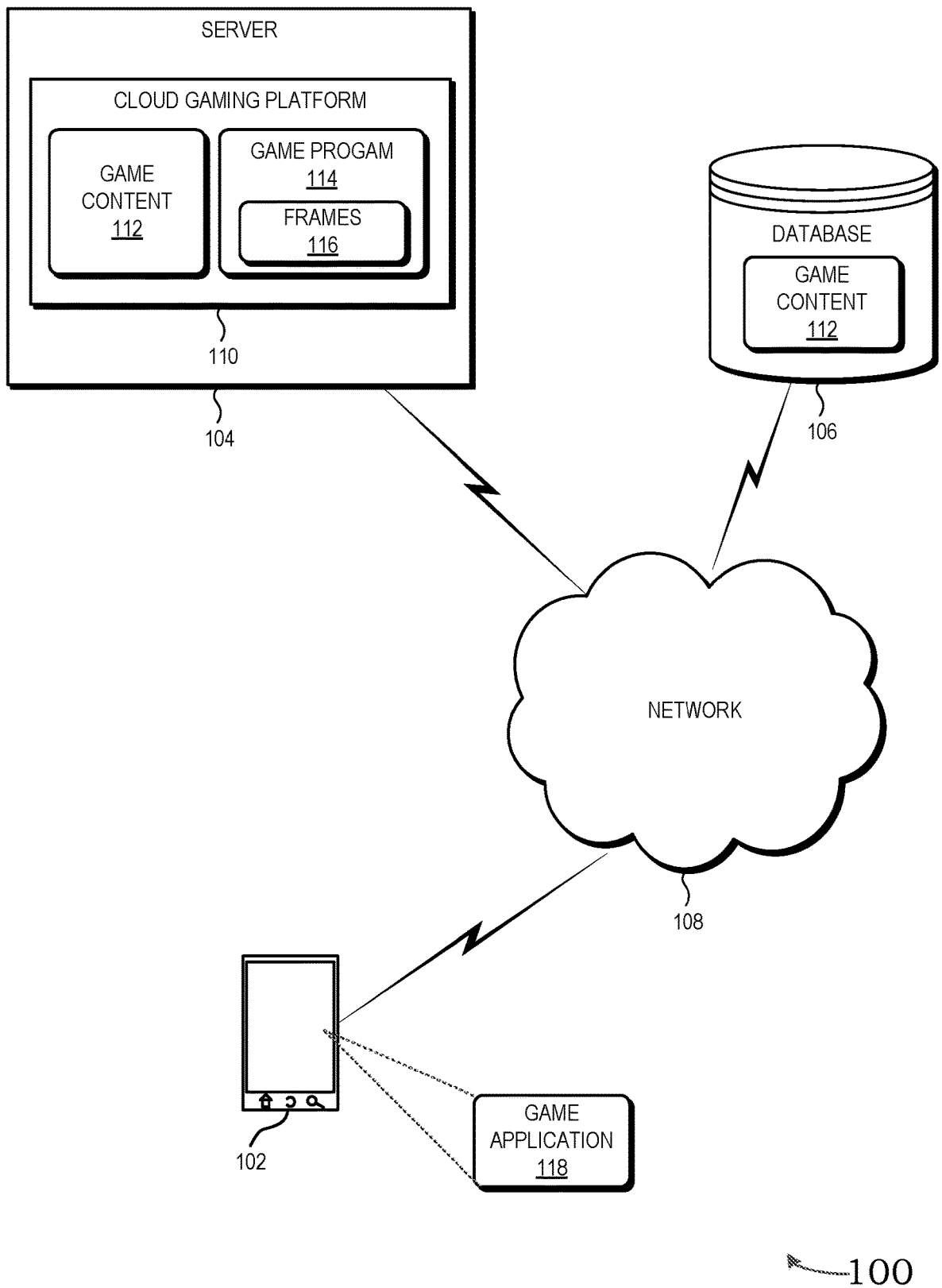
FIG. 1 is a block diagram of a cloud-based gaming system that supports real-time game content encoding in accordance with some embodiments.

A cloud-based gaming system, which enables end users to access and experience game applications, sometimes originally configured for non-portable devices (e.g., personal computers or game console setups), on remote devices such as portable client devices (e.g., laptops, smartphones). In cloud-based gaming systems, a network device (e.g., a gaming server) performs operations, such as graphics rendering, capturing, encoding, and streaming of game content to a communication network. The portable client devices receive an encoded bitstream of the game content over the communication network, decode the encoded bit stream and display the resulting images to a user.

To enhance the user experience, it is sometimes desirable for the cloud-based gaming system to generate and provide to the client device high-resolution high-frame-rate video streams. However, such high-quality video streams consume a large amount of network bandwidth and encoding resources. For example, a 60 frames-per-second (FPS) stream of 1080p frames (e.g., a 1080p video) using a particular codec requires a network bandwidth providing data rates of more than 25 megabits per second (Mbps) of consistent bandwidth to avoid degradation of the game content. Further, network bandwidth can vary based on a number of factors, such as the underlying technology supporting the particular network connection. For example, a digital subscriber line (DSL) connection provides data rates of 10-25 Mbps, a cable connection provides data rates of 50-100 Mbps, a fiber connection provides data rates of 100+ Mbps, and a satellite connection provides data rates of 15-25 Mbps. Therefore, based on the particular network connection, a particular codec may underperform and result in game content quality degrading, and thereby negatively impact the user experience.

To meet bandwidth requirements and maintain low-latency video streaming, some gaming systems use hardware accelerated encoders on various cloud-based platforms. These encoders for cloud-based applications focus on maximizing the objective game quality to meet a target bandwidth as closely as possible. Due to strict end-to-end latency requirements, it is typically the highest priority for these cloud-gaming systems to prevent overshooting a target frame size for every frame. However, the human vision system is much less sensitive to any additional subjective quality gain when the objective video quality of the encoded game content exceeds a threshold. That is, objective video quality, measured by peak signal to noise ratio (PSNR) (among other metrics), and subjective video quality, measured by a mean opinion score (MOS) indicate that above a certain PSNR level, the subjective video quality is maximized.

Various aspects of the present disclosure relate to techniques for adaptive encoding of game content, and more specifically to a peak signal to noise ratio (PSNR) guided encoding of the game content. An encoder, for example, receives a stream of frames related to the game content and outputs an encoded version of the stream of frames to stream over a network (e.g., the Internet). The encoder receives and encodes an input frame, which may be down-sampled, to obtain first encoding pass information. This allows the encoder to accurately predict a PSNR of the current, before it is encoded in a second encoding pass (i.e., final encoding phase). The encoder uses a content-adaptive statistical model (e.g., a linear regression model) in a moving window of previous frames up to the current frame to adaptively compute a lower-bound of a QP (MIN QP) that corresponds to a chosen PSNR target in decibels, and employs the lower-bound QP to the rate-control process to encode the current frame. The result of this PSNR-guided encoding is reducing the size of encoded frames while undershooting a target bit rate when the PSNR indicates that there are unlikely to be subjective quality losses on those frames. These reductions mitigate bandwidth issues and improve the overall gaming performance because less bits transferred results in faster network transmission, faster decoding and much less platform overhead, while maintaining overall quality for the game stream.

FIG. 1 is a block diagram of a cloud-based gaming system 100 that supports real-time game content encoding in accordance with some embodiments. The cloud-based gaming system 100 includes a client device 102, a server 104, and a database 106. Although the cloud-based gaming system 100 illustrates a single client device 102, a single server 104, a single database 106, and a single network 108, the present disclosure applies to any cloud-based gaming system architecture having one or more devices 102, servers 104, databases 106, and networks 108. The client device 102, the server 104, and the database 106 communicate with each other via network 108 using one or more communications links (e.g., a wireless connection, wired connection).

The server 104 may be a data server, a cloud server, a server associated with a gaming subscription provider, a proxy server, a web server, an application server, or any combination thereof. The server 104, in some embodiments, includes a cloud-gaming platform 110. The cloud-gaming platform 110 allows the client device 102 to discover, browse, share, and stream dynamic game content 112 that is rendered on the server via the network 108 using one or more communications links, or the static game content 112 that is stored on the database 106 by the real-time digital distribution via the network 108. As such, a digital distribution may be a form of delivering some static game content 112 such as audio, video, images, without the use of physical media but over online delivery mediums, such as the Internet.

The database 106 may store a variety of information, such as instructions or commands (e.g., game-related information). For example, the database 106 may store game content 112. The client device 102 may retrieve the game content 112 from the database 106 via the network 108 using one or more communication links. The network 108 may provide encryption, access authorization, tracking, Internet Protocol (IP) connectivity, and other access, computation, modification, and/or functions. Examples of network 108 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 108 may include the Internet.

The one or more communications links shown in the cloud-based gaming system 100 include uplink transmissions from the client device 102 to the server 104 and the database 106, and/or downlink transmissions, from the server 104 and the database 106 to the client device 102. These communications links may transmit bidirectional communications and/or unidirectional communications. In some embodiments, the communication links may be a wired connection or a wireless connection, or both. For example, the communications links may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The client device 102, in some embodiments, is a cellular phone, a smartphone, a tablet computer, a laptop computer, a display device (e.g., monitors), and/or the like that support various types of video codecs including h.264, vp9 or HEVC. In some embodiments, the server 104 and the client device 102 together implement a cloud gaming session for a user of the client device 102. To illustrate, the server 104 executes a game program 114 that generates a stream of frames 116 (images) based on a game state of a game implemented by the game program 114. The client device 102 executes a game application 118 that can receive the stream of frames from the server 104 and can receive input data from the user via a user interface (e.g., a game controller, touchscreen, and the like, or any combination thereof). The client device 102 provides the input data to the server 104, which updates the game state of the game program 114 and generates more frames for the stream of frames based on the updated game state.

To execute the respective programs and implement the game session, the client device 102 and the server 104 each include one or more of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the client device 102 may decode the encoded game content 112 (e.g., image data, video data, audio data) streamed from the server 104.

The server 104 may also be configured to provide enhancements, restoration, analysis, and synthesis, among other functionality on the game content 112. For example, the server 104 may perform white balancing, cropping, scaling (e.g., gaming compression), adjusting a resolution, stitching, color processing, spatial gaming filtering, artifact removal, frame rate adjustments, etc. By further example, the server 104 may process game content 112 to support adaptive encoding of the game content 112, according to the techniques described herein.

For example, during a game session, the server 104 may receive and encode an input frame associated with the stream of frames 116, which may be down-sampled, to obtain first encoding pass information, to help accurately predict the PSNR of a current or subsequent frame of the stream of frames 116, before it is encoded in a second encoding pass (i.e., a final encode phase). The server 104 uses a content-adaptive statistical model (e.g. a linear regression model) in a moving window of previous frames up to the current frame to adaptively compute a lower-bound of the QP that corresponds to a chosen PSNR target. The result of this PSNR-guided encoding is significantly reducing the size of encoded frames when undershooting a target bit rate in response to determining that there are no subjective quality losses on those frames using their PSNR as the guidance. These reductions mitigate bandwidth issues and improve the overall gaming performance because less bits transferred results in faster network transmission, faster decoding and much less platform overhead.

Figure 2:
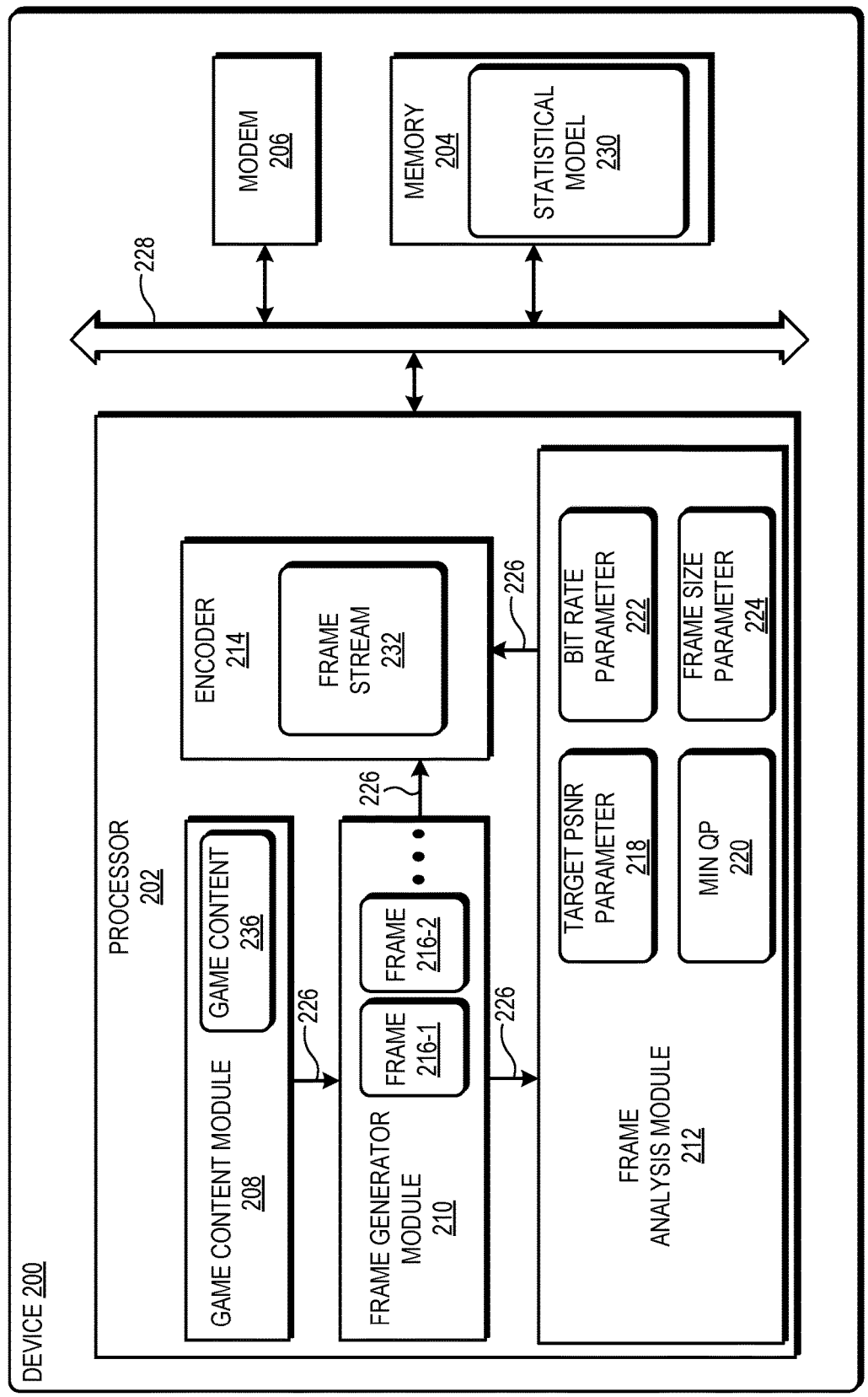
FIG. 2 is a block diagram of a device of the system of FIG. 1 that supports adaptive content encoding in accordance with some embodiments.

FIG. 2 is a block diagram of a device 200 of the system of FIG. 1 that supports adaptive game content encoding in accordance with some embodiments. In some embodiments, the device 200 implements aspects of the cloud-based gaming system 100 as described in FIG. 1. For example, the device 200 may be an example of a server 104 as described in FIG. 1. The device 200 includes one or more software and hardware components for bi-directional communications including components for encoding game content 236. In some embodiments, the device 200 is part of an electronic device that supports encoding of the game content 236, including a desktop computer, a server, a game console, and the like. In the example of FIG. 2, the device 200 includes at least a processor 202, a memory 204, and a modem 206. These components are in electronic communication via one or more interfaces (e.g., a bus 228).

The processor 202 is a processing device (e.g., a general-purpose processor, a CPU, a GPU, an ASIC, a FPGA, or the like) that generally supports execution of sets of instructions (e.g., computer programs) in order to carry out specified tasks on behalf of the device 200. In some embodiments, the processor 202 is configured to interface with the memory 204 using a memory controller integrated into the processor 202. The memory 204 includes a random-access memory (RAM) and a read-only memory (ROM). In some embodiments, the memory 204 stores computer-readable, computer-executable code including instructions that, when executed, cause the processor 202 to perform various functions described herein. In some embodiments, the memory 204 includes, among other features, a basic input/output system (BIOS), which controls basic hardware or software operations such as the interaction with peripheral components of the device 200. The code is stored in a non-transitory computer-readable medium as system memory or other type of memory. In some other embodiments, the memory 204, additionally or alternatively, stores a statistical model 230 related to improving performance of encoding of the game content 236 as described herein. The statistical model 230, as described herein, may include a linear regression model, which may map corresponding PSNR values to corresponding QP values.

The modem 206 communicates bi-directionally, via one or more antennas, wired, or wireless communication links (e.g., a Wi-Fi communication link, a cellular communication link). In some embodiments, the modem 206 is configured to modulate packets carrying encoded game content and provide modulated packets to the antennas for transmission, and to demodulate packets carrying encoded game content received from the antennas. In some embodiments, the modem 206 represents a wireless transceiver configured to communicate bi-directionally with another device, such as a client device 102 or a server 104 as described in FIG. 1.

In the illustrated embodiment, the processor 202 includes a game content module 208, a frame generator module 210, a frame analysis module 212, and an encoder 214. In some embodiments, the game content module 208 is configured to generate the game content 236 (e.g., images, video, audio) on behalf of the encoder 214 for communication to another computing device via the modem 206. For example, in some embodiments, the game content module 208 is a program executing at the processor 202 that generates game content for communication to another device.

To generate the game content 236, the game content module 208 signals to the frame generator module 210, via a control signal 226, to generate one or more frames 216 associated with the game content 236 (e.g., images, video, audio). For example, the game content module 208 signals to the frame generator module 210, via a control signal 226, to generate one or more frames associated with a cloud-based gaming application, or the like. The frame generator module 210 is implemented by the processor 202 or other components of the device 200. The frame generator module 210 signals to the encoder 214, via a control signal 226, the one or more generated frames 216.

The encoder 214 is implemented by the processor 202 or other components of the device 200. In some embodiments, the encoder 214 encodes the one or more generated frames 216 into an encoded frame stream 232 according to a specified encoding technique, referred to as a codec. In some embodiments, the encoder 214 is configured to forward the encoded frame stream 232, for example, to the modem 206 for transmission to another device (e.g., a client device 102 or a server 104, as described in FIG. 1). For example, the encoder 214 generates the frame stream 232, which may be an uncompressed video stream from a GPU renderer (e.g., on a server 104, as described in FIG. 1) and outputs an encoded video stream to stream over the Internet via the modem 206.

The processor 202 or other components of the device 200 signals to the frame generator module 210 via a control signal 226 to analyze the one or more frames 216 associated with the game content 236 (e.g., images, video, audio) to support adaptive encoding of the game content 236. The frame analysis module 212 initializes one or more parameters associated with analyzing the one or more frames 216 associated with the frame stream 232. These parameters include one or more of a PSNR parameter 218, a MIN QP 220, a bit rate parameter 222, or a frame size parameter 224, or any combination thereof.

The frame analysis module 212, in some embodiments, determines a target PSNR threshold based on one or more factors. For example, the frame analysis module 212 determines the target PSNR threshold to be 45 decibels (dB) based on an underlying technology supporting a particular network connection (e.g., DSL, Cable, Fiber, Satellite, etc.), and stores this value in the target PSNR parameter 218. Additionally, or alternatively, the frame analysis module 212 determines the target PSNR threshold to be 45 dB based on a default configuration (e.g., game settings) associated with a gaming application as described in FIG. 1, and stores this value in the target PSNR parameter 218. In some embodiments, the frame analysis module 212 determines a target bitrate in Mbps. For example, the frame analysis module 212 determines the target bit rate to be 28 Mbps and stores this value in the bit rate parameter 222. The frame analysis module 212, in some embodiments, determines a target frame size (e.g., in bits). The frame analysis module 212 may determine the target frame size based on the target bit rate or a frame rate, or a combination thereof. Additionally, or alternatively, the target frame size may be based on a fixed resolution associated with a default configuration (e.g., a game setting) associated with a gaming application, as described in FIG. 1. The frame analysis module 212 stores the values of the target frame size in the frame size parameter 224.

The encoder 214, in some embodiments, encodes the frame 216-1 and provides the encoding information to the frame analysis module 212. The encoding information may include a frame size of the frame 216-1 and a PSNR associated with the frame 216-1 (e.g., a PSNR of a luma plane). In some embodiments, the frame analysis module 212 or the encoder 214 downscales the frame 216-1 to a fraction of its original resolution. The encoder 214 encodes the downscaled frame 216-1 using a target bit rate, which can provide the PSNR estimation before encoding the current frame.

The frame analysis module 212 selects the MIN QP 220 for the frame 216-1. For example, the frame analysis module 212, in some embodiments, compares the estimated frame 216-1 PSNR to the target PSNR. If the PSNR of the frame 216-1 is greater than the chosen target PSNR, the frame analysis module 212 computes a lower-bound QP using a linear mapping according to Equation (1):

$$QP = f(PSNR) = \text{slope} * PSNR + \text{interception} \quad (1)$$

based on the statistical model 230 as described further below, and assigns the result as a lower-bound value for the MIN QP 220. The linear mapping is thus a function of a PSNR. In some embodiments, a value of the slope may be predefined based on an initialization. For example, the value of the slope may initially be set to zero. In some embodiments, a value of the intersection may be predefined based on an initialization. For example, the value of the intersection may initially be set to zero. The frame analysis module 212, in some embodiments, provides an indication or sets the MIN QP 220 for the encoder 214.

The frame analysis module 212, in some embodiments, may support rate control to adjust encoder parameters associated with the encoder 214 to achieve a target bitrate. In some embodiments, encoding of frames 216 may be an inherently lossy process. For example, the encoder 214 may achieve compression not only by removing truly redundant information from the frame stream 232 (a bitstream), but also by making small quality compromises in ways that are intended to be minimally perceptible. The MIN QP 220 provides a lower-bound of the QP the rate control can use. When the MIN QP 220 is very small, the rate control can retain almost all that detail. As the MIN QP 220 is increased, some of that detail is aggregated so that the bit rate drops, but at the price of some increase in objective distortion and some loss of objective quality with minimal subjective quality loss because the PSRN target may be chosen to be high enough. The frame analysis module 212 may thereby dynamically vary the MIN QP 220 based on PSNR estimates of the frames 216, so that each frame 216 has an appropriate allocation of bits to maximize the subject quality. Therefore, because MIN QP is determined by a high target PSNR, subjective quality loss is minimized.

By way of example, the frame analysis module 212 may subsequently receive a frame 216-2 and perform the rate control associated with encoding the frame 216-2 and thereby managing the quality of the encoded frame 216-2. In some embodiments, the frame analysis module 212 selects the MIN QP 220 for the frame 216-2 based on the encoding information associated with the frame 216-1. In some other embodiments, the frame analysis module 212 selects the MIN QP 220 for the frame 216-2 based on the statistical model 230, which may indicate the MIN QP 220 for the current window of frames that includes the frame 216-2. The frame analysis module 212 signals the selected MIN QP 220 to the encoder 214, which encodes the frame 216-2 based on the selected MIN QP 220 for the frame 216-2. The encoder 214 may determine and pass encoding information associated with the frame 216-2, for example, such as a PSNR associated with the frame 216-2 to the frame analysis module 212 after the current frame is encoded.

The encoder 214 provides the PSNR associated with the frame 216-2 to the frame analysis module 212, which updates the statistical linear regression model 230 with the encoding information including the selected QP for the frame 216-2. For example, the frame analysis module 212 uses the encoding information to fit, in a linear regression model, a linear curve to a current window of frames associated with the frame stream 232, as described in more detail in FIG. 4. The encoder 214 and the frame analysis module 212 may repeat the above operations for all frames 216 associated with the frame stream 232. The frame analysis module 210 thereby determines the MIN QP for a current frame to cap its PSNR to the target PSNR threshold. Thereby, the device 200 supports a function mapping from PSNR to QP to support adaptive encoding of the game content 236.

Accordingly, as explained above, the encoder 214 of the device 200 uses a content-adaptive linear regression model in a moving window of previous frames 216 up to a current frame 216 to adaptively compute the MIN QP 220 that corresponds to a chosen target PSNR parameter 218. The result of this PSNR-guided two-pass encoder is significantly reducing the size of encoded frames 216 in many cases by undershooting the target bitrate when there are no subjective quality losses on those frames using their PSNR as the guidance. These bit rate reductions not only mitigate the bandwidth problem, but also improve the overall performance.

Figure 3:
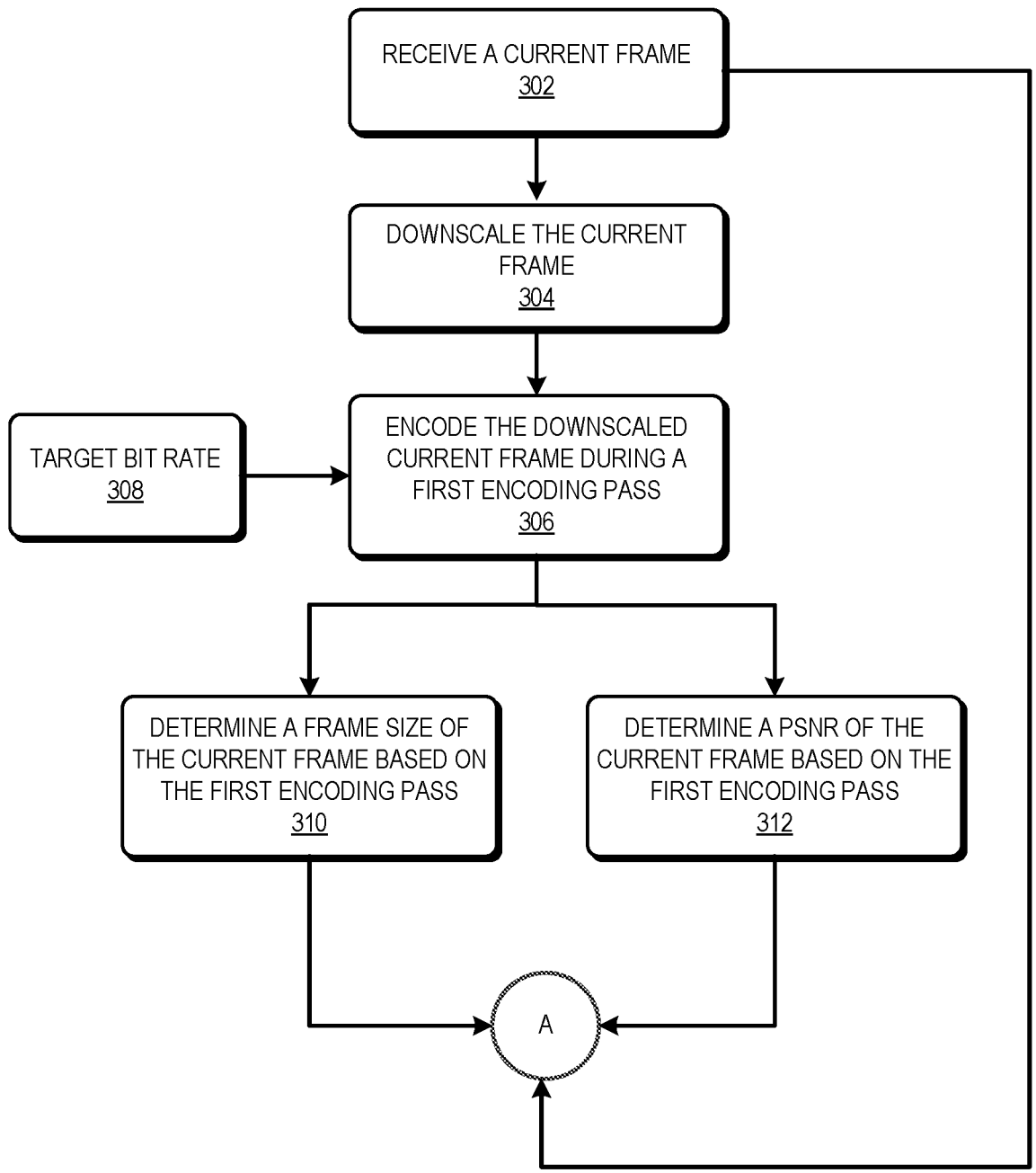
FIG. 3 is a flow diagram of a method for adaptive PSNR-guided game content encoding in accordance with some embodiments.

FIG. 3 is a flow diagram of a method for adaptive game content encoding in accordance with some embodiments. In some embodiments, the method is implemented by an encoder or its components as described with reference to FIG. 1. For example, an encoder is implemented or configured to perform the method to improve game content encoding in cloud-based gaming applications to reduce latency and increase the reliability of encoding game content. In some embodiments, an encoder executes a set of instructions to control the functional elements of the encoder to perform the operations described below. Additionally or alternatively, an encoder performs aspects of the operations described below using special-purpose hardware.

In the example of FIG. 3, an encoder performs one or more initialization operations and a first encoding operation. As part of an initialization phase, in some embodiments, determines a default target PSNR or a default initial MIN QP, or both. In some other embodiments, the encoder also determines a maximum number of frames for the frame range. In other embodiments, the encoder determines target PSNR threshold (e.g., 45 dB), a target bit rate parameter (e.g., 28 Mbps), or a target frame size parameter, or any combination thereof. The encoder may also be preconfigured with one or more of the above parameters as part of the initialization operation of the method for adaptive game content encoding.

As part of the first encoding phase, at block 302, an encoder receives a current frame, for example, from a stream of frames associated with a cloud-based gaming application. At block 304, the encoder downscales the current frame. For example, the encoder downscales the current frame by a fraction of the current frame original resolution. In some embodiments, the encoder downscales the current frame by a one-half (½) of the current frame original resolution. In some other embodiments, the encoder downscales the current frame by a quarter (¼) of the current frame original resolution. In other embodiments, the encoder downscale by a different fraction of a current frame original resolution. At block 306, the encoder encodes the downscaled current frame during a first encoding pass. In some embodiments, the encoder encodes the downscaled current frame during a first encoding pass based on a target bit rate.

At block 308, the encoder determines the target bit rate based on a default setting or configuration of the encoder. In some embodiments, the encoder thereby determines a target bit rate that can be expressed in Mbps, such as 28 Mbps, based on a default setting or configuration of the encoder. The encoder encodes the downscaled current frame during the first encoding pass based on the target bit rate of 28 Mbps. In some embodiments, the encoder encodes the downscaled current frame during the first encoding pass based on a fraction of the target bit rate (e.g., a quarter (¼) of the target bit rate). For example, the encoder encodes the downscaled current frame during the first encoding pass based on a fraction of the target bit rate of 28 Mbps (e.g., 7 Mbps). At block 310, the encoder, additionally or alternatively, determines a frame size of the current frame based on the first encoding pass. At block 312, the encoder determines a PSNR of the current frame by the estimation based on the first encoding pass. For example, the encoder uses special-purpose hardware and software technologies to determine the PSNR of a luma plane during the first encoding pass of the current frame.

Figure 4:
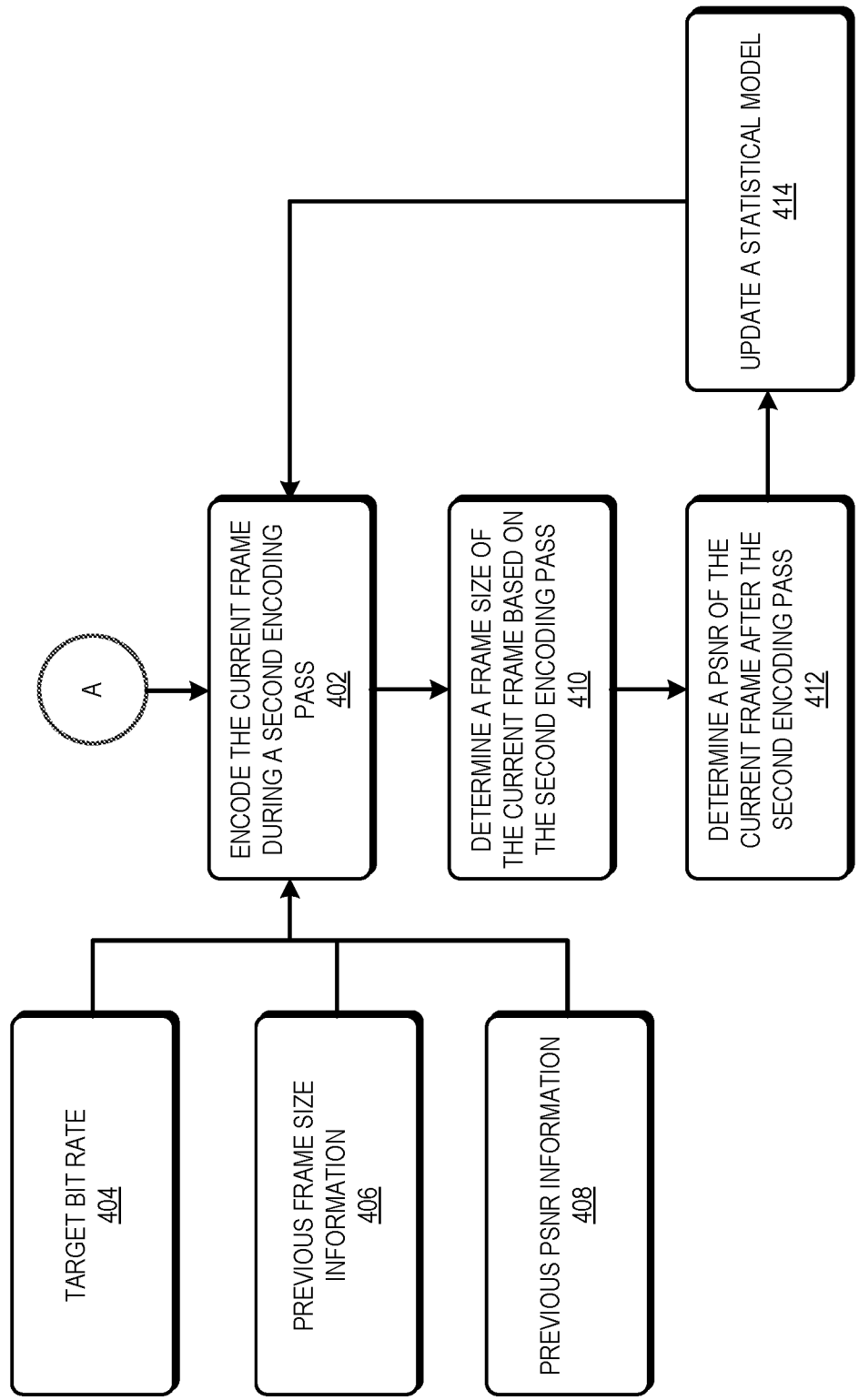
FIG. 4 is a flow diagram illustrating additional aspects of the method of FIG. 3 including a statistics model for a PSNR-to-QP mapping in accordance with some embodiments.

FIG. 4 is a flow diagram illustrating additional aspects of the method of FIG. 3 in accordance with some embodiments. In some embodiments, the method is implemented by an encoder or its components as described with reference to FIG. 1. In some embodiments, an encoder executes a set of instructions to control the functional elements of the encoder to perform the operations described below. Additionally or alternatively, an encoder performs aspects of the operations described below using special-purpose hardware.

In the example of FIG. 4, an encoder performs an encoding operation, which may be a second encoding operation of a two-pass encoding operation. At block 402, the encoder encodes a current frame during a second encoding pass. The encoding during the second encoding pass may be based on one or more parameters (e.g., a minimum quantization parameter, a target bit rate parameter). At block 404, the encoder determines a target bit rate. At block 406, the encoder determines previous frame information. At block 408, the encoder determines previous PSNR information. Thereby, the encoding of the current frame during the second encoding pass may be based on the target bit rate, the previous frame information, or the previous PSNR information, or the estimated PSNR from the first encoding pass or any combination thereof.

At block 410, the encoder determines a frame size of the current frame based on the second encoding pass. At block 412, after the second encoding pass, the encoder determines a PSNR of the current frame. At block 414, the encoder updates a statistical model, for example, a linear regression model based on the pair of {current psnr, current qp} to compute the mapping of QP=f(PSNR)=slope*PSNR+interseption.

The encoder maintains a double-ended queue of pairs of {PSNR, QP} in a moving window of previous frames up to the current frame. After the second encoding pass of the current frame, the pair of {PSNR, QP} of the current frame is pushed to the tail of the queue. When the size of the queue reaches the maximum size, which is determined by the initialization phase of the encoder, block 414 fits a linear curve, defined by $$QP=a*PSNR+b,$$

to the current queue of pairs of {PSNR,QP}, where a is the intersection and b is the slope. In some embodiments, an average PSNR and an average QP are computed for the queue. For each pair of {PSNR,QP} in the queue, the difference between the average PSNR, and the PSNR is squared, and the result is then accumulated to s_xx. Similarly, the difference between the average QP and the QP is multiplied by the difference between the average PSNR, and then accumulated to s_xy. In some embodiments, the intersection (b) and the slope (a) of the linear curve are determined by the following formulas:

$$a=s\_xy/s\_xx$$

$$b=\text{average QP-slope*average PSNR}.$$

In some embodiments, the encoder, at last removes the pair of {PSNR,QP} in the front of the queue.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below.

It is therefore evident that the particular embodiments disclosed above may be altered or modified and all such variations are considered within the scope of the disclosed subject matter. Accordingly, the protection sought herein is as set forth in the claims below.

What is claimed is:

1. A method for encoding video, comprising:
   for each frame in a stream of frames:
      performing a first encoding pass of a downscaled version of the frame;
      determining an estimated peak-signal-to-noise ratio for the frame based on the first encoding pass of the downscaled version of the frame;
      determining, by a statistical model, a quantization parameter in response to the estimated peak-signal-to-noise ratio of the frame being greater than a target peak-signal-to-noise ratio for the stream of frames; and
      encoding the frame in a second encoding pass based on the quantization parameter.

2. The method of claim 1, further comprising:
   for a frame of the stream of frames:
      determining a linear mapping from the target peak-signal-to-noise ratio to the quantization parameter for the frame by fitting pairs of peak-signal-to-noise ratios and quantization parameters in a moving window of previously encoded frames of a double-ended queue to a linear curve,
      wherein the linear mapping is updated after the second encoding pass of the frame.

3. The method of claim 2, further comprising:
for a frame of the stream of frames, determining a lower bound value of the quantization parameter based on the target peak-signal-to-noise ratio and the linear mapping as updated after the second encoding pass of a previous frame of the stream of frames.

4. The method of claim 2, further comprising:
for a frame of the stream of frames, determining an intersection and a slope of the linear mapping from the target peak-signal-to-noise ratio to the quantization parameter based on the moving window of previously encoded frames.

5. The method of claim 4, further comprising:
maintaining a size of the moving window of previously encoded frames associated with pairs of peak-signal-to-noise ratios and quantization parameters.

6. The method of claim 1, further comprising:
for each frame of the stream of frames, updating thea statistical model based on a peak-signal-to-noise ratio associated with the second encoding pass of the frame.

7. The method of claim 1, further comprising:
for each frame of the stream of frames:
computing a first peak-signal-to-noise ratio between an uncompressed frame and a reconstructed frame from the first encoding pass; and
computing a second peak-signal-to-noise ratio between the uncompressed frame and a reconstructed frame from the second encoding pass.

8. The method of claim 1, wherein the statistical model comprises a linear regression model based on pairs of peak-signal-to-noise ratios and quantization parameters of previously encoded frames.

9. The method of claim 1, further comprising:
determining a target peak-signal-to-noise ratio threshold for the stream of frames, wherein encoding each frame of the stream of frames is based on the target peak-signal-to-noise ratio threshold.

10. The method of claim 1, further comprising:
for each frame of the stream of frames, performing the first pass encoding on the downscaled version of the frame based on a target bit rate parameter.

11. An apparatus for encoding video, comprising:
one or more processors;
memory coupled to the one or more processors; and
instructions executable by the one or more processors to:
for each frame in a stream of frames:
perform a first encoding pass of a downscaled version of the frame;
determine an estimated peak-signal-to-noise ratio for the frame based on the first encoding pass;
determine, by a statistical model, a quantization parameter in response to the estimated peak-signal-to-noise ratio of the frame being greater than a target peak-signal-to-noise ratio for the stream of frames; and
encode the frame in a second encoding pass based on the quantization parameter.

12. The apparatus of claim 11, wherein the instructions are further executable by the one or more processors to:
for each frame in the stream of frames:
update the statistical model based on the second encoding pass for the frame.

13. The apparatus of claim 11, wherein the statistical model comprises a linear regression model.

14. The apparatus of claim 13, wherein the linear regression model is based on one or more pairs of peak-signal-to-noise ratios and quantization parameters of previously encoded frames.

15. The apparatus of claim 11, wherein the instructions are further executable by the one or more processors to:
for a frame of the stream of frames:
determine a linear mapping from the target peak-signal-to-noise ratio to the quantization parameter for the frame by fitting pairs of peak-signal-to-noise ratios and quantization parameters in a moving window of previously encoded frames of a double-ended queue to a linear curve; and
encoding the frame based on the quantization parameter during the second pass encoding.

16. A non-transitory computer-readable medium storing code for encoding content, the code comprising instructions executable by a processor to:
for each frame of a stream of frames:
performing a first encoding pass of a downscaled version of the frame;
determining an estimated peak-signal-to-noise ratio for the frame based on the first encoding pass of the downscaled version of the frame;
determine, by a statistical model, a quantization parameter in response to the estimated peak-signal-to-noise ratio of the frame being greater than a target peak-signal-to-noise ratio for the stream of frames; and
encode the frame in a second encoding pass based the quantization parameter.

17. The non-transitory computer-readable medium of claim 16, wherein the instructions are further executable by the processor to:
for each frame in the stream of frames:
update the statistical model based on the second encoding pass for the frame.

18. The non-transitory computer-readable medium of claim 16, wherein the statistical model comprises a linear regression model.

19. The non-transitory computer-readable medium of claim 18, wherein the linear regression model is based on one or more pairs of peak-signal-to-noise ratio and quantization parameters of previously encoded frames.

20. A method for encoding video, comprising:
for each frame in a stream of uncompressed frames:
performing a first encoding pass of a downscaled version of the uncompressed frame to produce a first reconstructed frame;
computing a first peak-signal-to-noise ratio between the uncompressed frame and the first reconstructed frame;
encoding the uncompressed frame in a second encoding pass based on a comparison of the first peak-signal-to-noise ratio to a target peak-signal-to-noise ratio for the stream of uncompressed frames to produce a second reconstructed frame; and
computing a second peak-signal-to-noise ratio between the uncompressed frame and the second reconstructed frame from the second encoding pass.

* * * * *